(12) United States Patent
Feigenblum

(10) Patent No.: US 11,390,001 B2
(45) Date of Patent: Jul. 19, 2022

(54) METHOD AND DEVICE FOR CONSOLIDATING A TEXTILE PREFORM AND OVERMOULDING

(71) Applicant: ROCTOOL, Le Bourget du Lac (FR)

(72) Inventor: José Feigenblum, Saint Paul (FR)

(73) Assignee: ROCTOOL, Le Bourget du Lac (FR)

( * ) Notice: Subject to any disclaimer, the term of this patent is extended or adjusted under 35 U.S.C. 154(b) by 412 days.

(21) Appl. No.: 16/340,630

(22) PCT Filed: Oct. 18, 2017

(86) PCT No.: PCT/EP2017/076650
§ 371 (c)(1),
(2) Date: Dec. 29, 2019

(87) PCT Pub. No.: WO2018/073324
PCT Pub. Date: Apr. 26, 2018

(65) Prior Publication Data
US 2020/0215733 A1 Jul. 9, 2020

(30) Foreign Application Priority Data
Oct. 19, 2016 (FR) ...................................... 16 70612

(51) Int. Cl.
*B29C 45/73* (2006.01)
*B29B 11/06* (2006.01)
(Continued)

(52) U.S. Cl.
CPC .............. *B29C 45/73* (2013.01); *B29B 11/06* (2013.01); *B29C 35/0805* (2013.01);
(Continued)

(58) Field of Classification Search
CPC ..... B29C 45/73; B29C 35/0805; B29C 45/04; B29C 45/1418; B29C 45/1756;
(Continued)

(56) References Cited

U.S. PATENT DOCUMENTS 6,749,784 B2    6/2004  Blanchon
9,352,490 B2 *  5/2016  Piccin ................. B29C 45/1418
(Continued)

FOREIGN PATENT DOCUMENTS

CN    204109229 U  *  1/2015
EP    0 576 196 A1    12/1993
(Continued)

*Primary Examiner* — Jacob T Minskey
*Assistant Examiner* — S. Behrooz Ghorishi
(74) *Attorney, Agent, or Firm* — Im IP Law; Chai Im; C. Andrew Im

(57) ABSTRACT

A device to thermoform a composite component and injection over-moulding a shape on one face of the composite component in a mould. The mould includes a paired shaping die and punch between them defining a closed cavity. The shaping die is mounted on a transfer device. The transfer device includes a loading/unloading station to load/unload a blank onto/from the shaping die, and an injection and mould-closure station to close the mould and to inject between the punch and the shaping die. The shaping die includes a network of inductors to heat its moulding surface and a cooling network to cool the moulding surface by a circulation of a fluid. The loading/unloading station includes a placement device to place a radiating element facing the moulding surface of the shaping die.

6 Claims, 3 Drawing Sheets

(51) Int. Cl.
    *B29C 35/08*    (2006.01)
    *B29C 45/04*    (2006.01)
    *B29C 45/14*    (2006.01)
    *B29C 45/17*    (2006.01)

(52) U.S. Cl.
    CPC .......... *B29C 45/04* (2013.01); *B29C 45/1418* (2013.01); *B29C 45/1756* (2013.01); *B29C 2035/0811* (2013.01); *B29C 2045/14286* (2013.01); *B29C 2045/7368* (2013.01)

(58) Field of Classification Search
    CPC ... B29C 2035/0811; B29C 2045/14286; B29C 2045/7368; B29C 45/14631; B29C 70/086; B29C 70/46; B29C 33/06; H05B 6/105; B29B 11/06
    See application file for complete search history.

(56) References Cited

U.S. PATENT DOCUMENTS

| | | | |
|---|---|---|---|
| 9,862,132 | B2 | 1/2018 | Feigenblum et al. |
| 2009/0127253 | A1* | 5/2009 | Stark ........................ B29C 35/08 219/660 |
| 2010/0201040 | A1 | 8/2010 | Guichard et al. |
| 2010/0276075 | A1 | 11/2010 | Manzoni et al. |
| 2012/0145703 | A1* | 6/2012 | Matsen ................... H05B 6/105 219/618 |
| 2013/0026678 | A1 | 1/2013 | Qin et al. |
| 2014/0183178 | A1 | 7/2014 | Guichard et al. |
| 2015/0197047 | A1* | 7/2015 | Ferguson ............. B29C 45/1671 428/195.1 |
| 2016/0207818 | A1 | 7/2016 | Lee et al. |

FOREIGN PATENT DOCUMENTS

| | | |
|---|---|---|
| EP | 1 136 239 A2 | 9/2001 |
| EP | 2 861 399 B1 | 12/2016 |
| EP | 2 742 773 B1 | 10/2018 |
| EP | 1 894 442 B1 | 2/2019 |
| WO | 2011/023899 A1 | 3/2011 |

* cited by examiner

METHOD AND DEVICE FOR CONSOLIDATING A TEXTILE PREFORM AND OVERMOULDING

RELATED APPLICATIONS

This application is a § 371 application from PCT/EP2017/076650 filed Oct. 18, 2017, which claims priority from French Patent Application No. 16 70612 filed Oct. 19, 2016, each of which is herein incorporated by reference in its entirety.

FIELD OF THE INVENTION

The invention relates to a method and a device for consolidating a textile preform and creating an overmoulding on the component thus consolidated. The invention is more particularly suited to the creation of a component made of long-fibre or continuous-fibre reinforced composite in the overall shape of a shell, which component comprises an overmoulded technical face notably comprising ribs, grooves, fixing wells or positioning or assembly elements, without this list being either limiting or exhaustive.

Such a component is for example represented by a cover for a piece of electronic equipment, such as a television screen, although the invention is equally applicable in other fields, such as the automotive or aeronautical fields, or in the field of luggage. The use of a long-fibre or continuous-fibre textile preform makes it possible to reduce the weight of such a component while at the same time increasing its mechanical strength by comparison with prior art solutions employing a short-fibre reinforced injected polymer.

BACKGROUND OF THE INVENTION

To this end, according to the prior art, a preconsolidated blank made up of a stratified continuous-fibre thermoplastic composite is preheated to a temperature high enough to allow interlaminar slippage of the plies of which it is made up. The said blank is placed on a shaping die and thermoformed to the shape of this die, as the mould closes. After, or at the same time as, the reconsolidation of the said shaped blank, the technical face is injection overmoulded in this same mould, then the component is demoulded after cooling.

This manufacturing cycle leads to several cycles of heating and cooling both the blank and the mould. Thus, in order to perform the thermoforming, the blank is raised to a temperature close to, or even higher than, the melting point of its polymer matrix, so as to allow the interlaminar slippage of the plies of which it is made, while the shaping die, and the mould in general, are preheated to a temperature close to or slightly higher than the consolidation temperature or glass transition temperature of the said polymer matrix. The consolidation of the shaped blank and then the injection require cooling of the mould to a temperature suited to the consolidation of the blank but high enough to allow the injection and the filling of all the details of the mould, then the component needs to be cooled to a temperature suited to its demoulding, before the mould is opened. This mould has then to be heated up again in order to repeat the cycle. The durations of the heating-cooling cycles define the time taken to produce the component. When they are implemented by means of indirect heating of the mould, for example via circulation of fluid or electrical resistances running through the mould, they are lengthy in comparison with the production rates sought for the components dependent on the invention. According to the prior art, the heating of the blank is performed outside the mould using radiant panels radiating in the infrared, and the said blank, once deconsolidated and ready to be thermoformed, loses its cohesion and becomes difficult to handle.

The induction heating technique, as described in particular in document EP 1 894 442, allows a mould intended for thermoforming or for injection to be heated and cooled rapidly and makes it possible to obtain fine control both over the temperature and over the uniformity of this temperature on the moulding surfaces of the mould by limiting the mould volume actually heated. Although this technical solution allows control over the temperature of a mould, particularly an injection or thermoforming mould, it does not allow the blank to be preheated.

Document EP 2 861 399 describes another technical solution for heating the surfaces of a mould, using a radiating element raised to a high temperature, positioned facing the said moulding surfaces. This technical solution on its own does not allow control over the temperature in the moulding cavity once the radiating element has been moved away from the surfaces and the mould has been closed.

OBJECT AND SUMMARY OF THE INVENTION

The invention seeks to overcome the disadvantages of the prior art in order to produce, at high production rates, a thermoformed composite component comprising an overmoulding, and to this end relates to a device for thermoforming a composite component and injection overmoulding a shape on one face of the said composite component, in a mould comprising a paired shaping die and punch between them defining a closed cavity, the said shaping die being mounted on a transfer device comprising:
  a. a loading/unloading station for loading/unloading a blank onto/from the shaping die;
  b. an injection and mould-closure station closing the mould and injecting between the punch and the shaping die;
in which the shaping die comprises a network of inductors for heating its moulding surface and a cooling network for cooling the said moulding surface by circulation of fluid, and the loading/unloading station comprises a device for placing a radiating element facing the moulding surface of the shaping die. Thus, the device allows the blank to be preheated directly on the shaping die before the mould is closed in order to perform the injection. Because the blank is preheated once it is in place on the shaping die, it is easy to handle while it is being loaded, notably by a robot.

The invention is advantageously implemented according to the embodiments and alternative forms set out hereinafter, which are to be considered individually or in any technically feasible combination.

Advantageously, the radiating element is an induction heated screen. Thus, the screen, for example a graphite screen, is rapidly raised to a high temperature and allows rapid heating of the blank and of the shaping die.

Advantageously, the network of inductors of the shaping die and the one that performs the heating of the radiating element are supplied with high-frequency current by one and the same single generator, thus reducing the installed electrical power and the cost of the installation.

According to one particular embodiment, the device comprises a switch for alternatively powering the network of inductors of the shaping die and the one that performs the heating of the radiating element, using the single high-frequency generator. The switch makes it possible easily and automatically to change which station of the transfer device is being powered with high-frequency current by the single generator.

According to one particularly advantageous embodiment, the device that forms the subject of the invention comprises two shaping dies each one paired with the punch and each one comprising a network of inductors and a cooling circuit for heating and cooling their moulding surfaces, these dies being mounted on the transfer device in such a way that one of the dies is at the loading/unloading station when the other is at the injection station.

Advantageously, the induction heating circuit that heats the radiating element or the circuit comprising the network of inductors of the shaping die comprises a capacitors unit or a smoothing coil. These means make it possible to impedance-match each circuit and ensure start-up and optimum operation of the high-frequency generator, whichever circuit is being powered, even though these circuits have different electrical characteristics.

The invention also relates to a method for producing a shaped composite component comprising an overmoulding, implementing a device according to the invention and comprising the steps consisting in:
  i. placing a composite blank on one of the shaping dies at the loading/unloading station;
  ii. preheating the said die and the blank in contact therewith up to a temperature T1 suited to the thermoforming of the said blank;
  iii. transferring the die to the injection station,
  iv. closing the mould onto the said die while maintaining the temperature T1 so as to perform the thermoforming of the blank;
  v. cooling the die down to a temperature T2 suited to the consolidation of the blank and to the injection;
  vi. injecting the overmoulded part;
  vii. cooling the moulding cavity down to the demoulding temperature;
  viii. opening the mould;
  ix. transferring the die to the loading/unloading station;
  x. demoulding the component and repeating from step i)

in which steps i) and x) are performed on the first die at the same time as steps iv) to vi) are being performed on the second die, and step ii) is performed on the first die at the same time as steps vii) and viii) are being performed on the second die. Thus, the tasks are performed in parallel and the production rate is increased.

Advantageously, step ii) involves heating the blank and the shaping die by means of the radiating element.

According to one embodiment implementing a device according to the invention comprising a switch, the said switch directs the supply of high-frequency current towards the means of heating of the radiating element during step ii) and towards the network of inductors of the second shaping die during steps iv) to vi).

BRIEF DESCRIPTION OF THE DRAWINGS

The invention is set out hereinafter according to preferred embodiments thereof, which are in no way limiting, and with reference to FIGS. 1 to 5 in which.

DETAILED DESCRIPTION OF THE EMBODIMENTS

Figure 1:
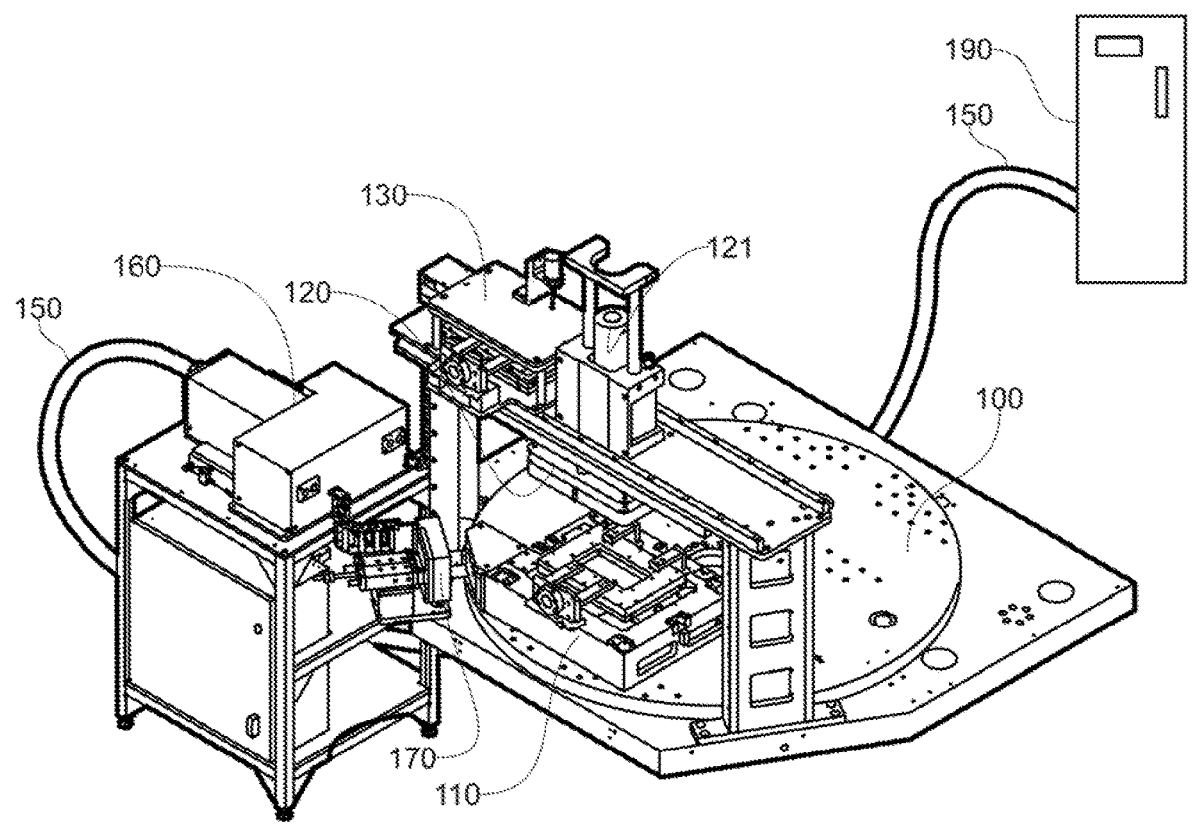
FIG. 1 is a perspective view of one embodiment of the device that forms the subject matter of the invention.

In FIG. 1, according to one embodiment of the device that forms the subject matter of the invention in an embodiment comprising just one shaping die, the said device comprises a rotary circular transfer device (100) rotating over at least one quarter of a turn (90°). A die (110) is mounted on the said transfer device (100) and in this figure is situated at the injection station, facing a punch (120) paired with the said die and the vertical movement of which is brought about by an actuating cylinder (121). The vertical movement of the said punch (120) allows the closing and opening of the mould formed by the punch (120) and the die (110), the moulding surfaces of which delimit a closed cavity containing the component when the mould is closed. When the circular transfer table is rotated through a quarter of a turn, the said die (110) is positioned at the loading/unloading station under a preheating device (130) comprising a radiating screen and means to allow the heating of this radiating screen. By way of nonlimiting example, the radiating screen is made up of a graphite panel. The device is connected by a power line (150) to a high-frequency current generator (not depicted). By way of example, the said generator produces a current at a frequency of between 10 kHz and 200 kHz for a power of between around ten and several hundred kW, depending on the intended application. A switch (160) allows this single generator (150) to be used to supply high-frequency current to the shaping die (110) when the latter is at the injection station or to the preheating device (130) at the loading/unloading station. According to this embodiment, the injection station further comprises a controlled connection (170) collaborating with means associated with the shaping die (110) so as to electrically power the network of inductors of the said die.

Figure 2:
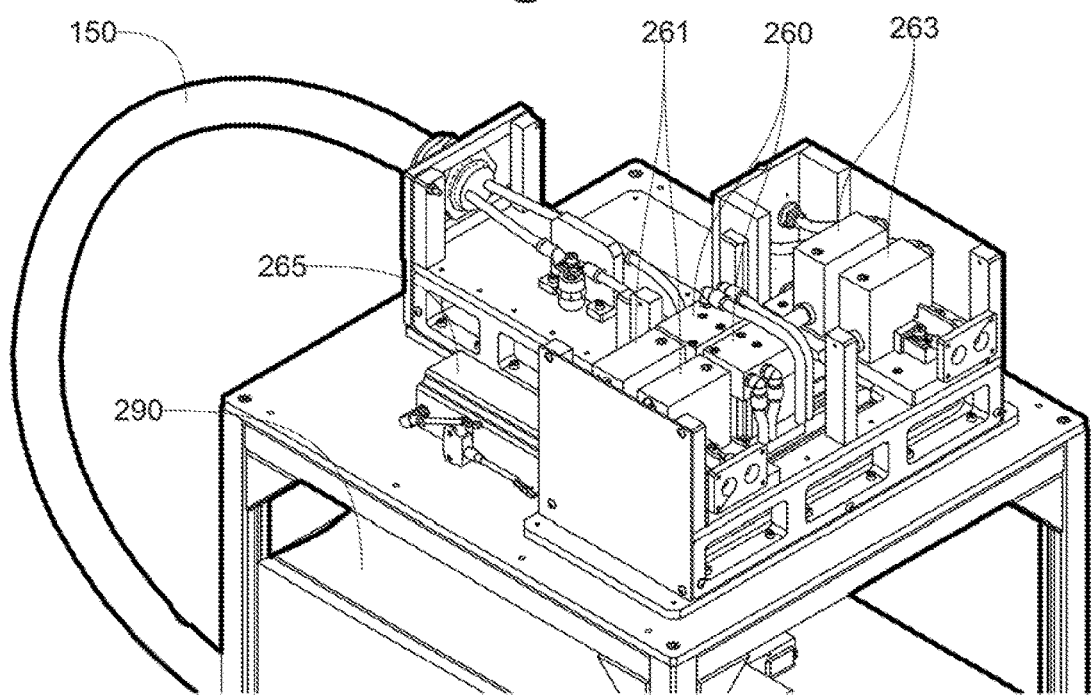
FIG. 2 is a partial perspective view of one embodiment of the switch without its covers.

In FIG. 2, according to one embodiment, the switch comprises a high-frequency electrical current input (150) connected on one side to the high-frequency generator and on the other to a slider (260) made up of two conductor units, for example made of copper. According to this embodiment, the slider (260) is able to move in a translational movement controlled by a stepping electric motor (265) between two pairs (261, 263) of receiver contacts, one (263) of the said pairs being connected to the radiating panel induction heating circuit and the other (261) to the induction circuit comprising the network of inductors of the shaping die. The said receiving contacts (261, 263) are each made up of two conducting units, for example made of copper. An electronic control box (290) controls the stepping motor (265) to switch the high-frequency supply over between the radiating panel and the network of inductors of the shaping die. Each of the induction electric circuits of the radiating panel of the shaping die comprises, if need be, a capacitors unit and a smoothing coil (neither depicted), as described in document EP 2 742 773/US-2014-0183178, so as to allow the high-frequency generator to start up and operate optimally when powering one or other of the induction circuits.

Figure 3:
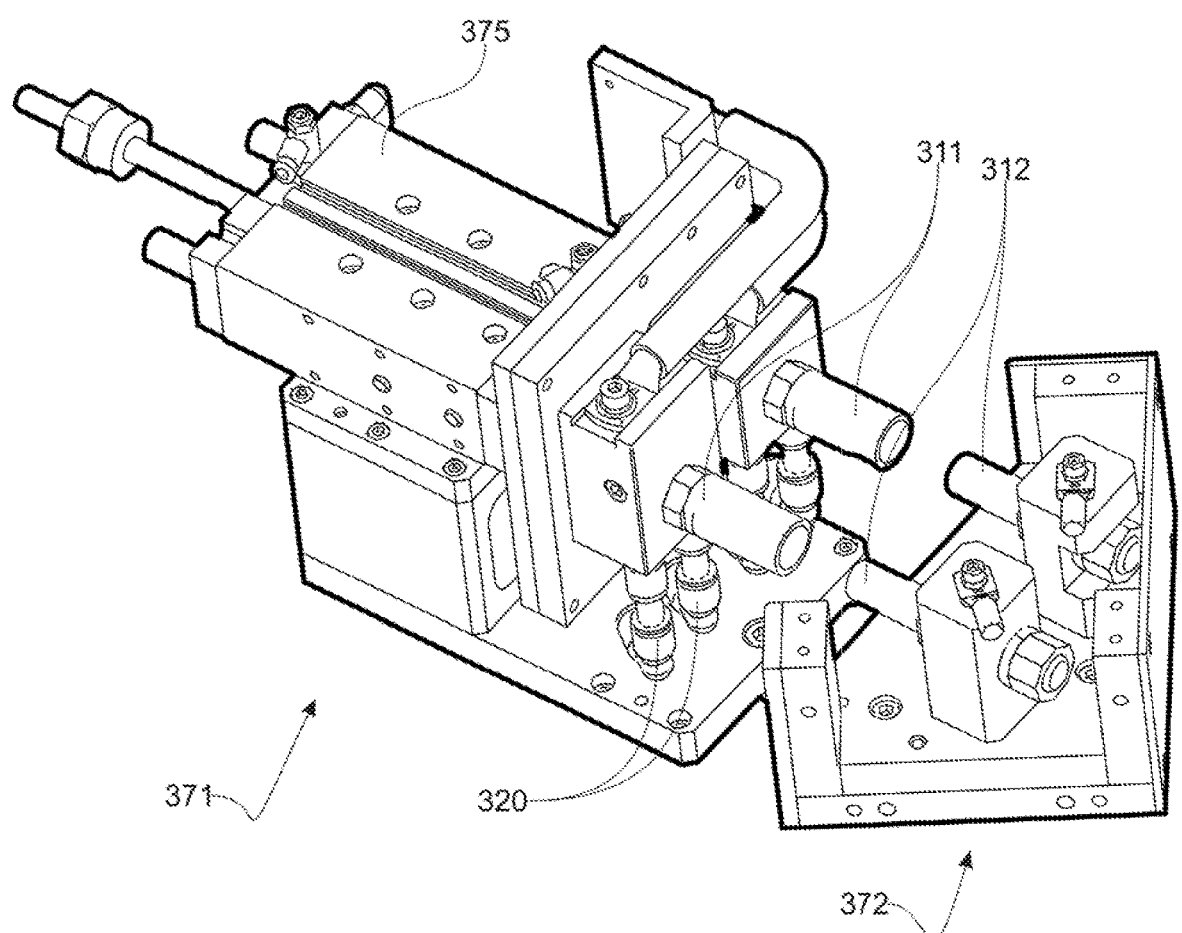
FIG. 3 depicts a partial perspective view of one embodiment of the controlled connection, without its covers, for the electrical connection of the network of inductors of the shaping die to the high-frequency generator at the injection station of the device that forms the subject matter of the invention.

In FIG. 3, according to one embodiment, the controlled connection comprises a part (371) that is fixed with respect to the injection station of the transfer device and a part (372) that is connected to the forming die. The fixed part (371) comprises a pair of female contacts (311), insulated on the exterior surface, able to make a connection with a pair of male contacts (312) on the part (372) connected to the shaping die. According to this embodiment, the connection is made by moving the said female contacts (311), this movement being achieved by a dual-acting pneumatic actuating cylinder (375). Compressed-air-circulation means (320) allow cooling of the contacts (311).

Figure 4:
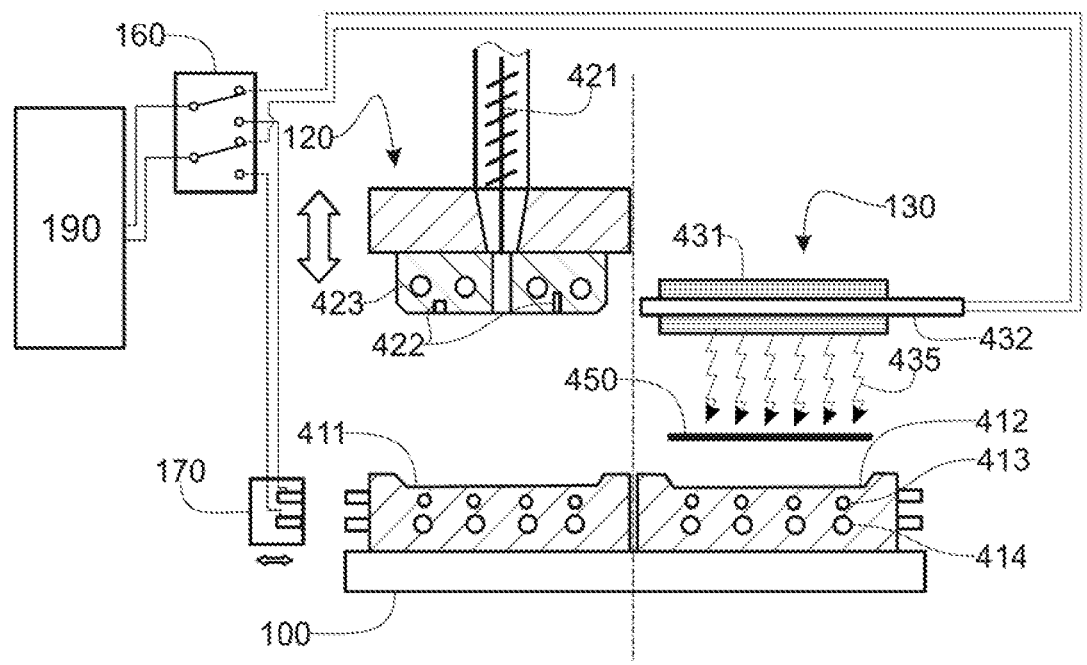
FIG. 4 illustrates a schematic view in cross section of one embodiment of the device that forms the subject matter of the invention comprising two shaping dies.

In FIG. 4, according to one embodiment, the device that forms the subject of the invention comprises two shaping dies (411, 412) placed on the transfer table (100). The said transfer table (100) allows the first (411) and the second (412) dies to be moved alternately between the loading/unloading station and the injection station by effecting a portion of a turn, 90° or 180°. Thus, the device that forms the subject matter of the invention, according to this embodiment, allows the production of two components by having the operations performed on these two components performed in parallel according to a swing cycle. Each shaping die (411, 412) comprises a network of inductors (413) extending in cavities made in the said die and cooling ducts (414) for the circulation of a fluid. This embodiment of the shaping dies and the alternatives forms thereof are described notably in document EP 1 894 442. The punch (120) positioned at the injection station defines a closed cavity when brought into contact with one of the shaping dies, which closed cavity is comprised between the moulding surfaces of the die and of the punch. The moulding surface of the punch comprises shapes (422) corresponding to the reliefs created on the component produced by overmoulding. To this end, said punch comprises means (421) of injecting plastic into the closed cavity comprised between the moulding surfaces of the punch and of the shaping die. According to one embodiment, the punch also comprises cooling ducts (423) for the circulation of a fluid. The loading/unloading station comprises a radiating-element heating device (130). This heating device for example comprises a graphite panel (431), placed inside a coil (432), which the coil is connected to a high-frequency generator (190) via the switch (160). When the said turn coil (432) is powered with high-frequency current, the graphite panel (431) is heated by induction and rapidly raised to a high temperature, for example 1000° C. The high emissivity coefficient of graphite means that a large proportion of the energy used to heat it can be transferred by radiation. Induction heating allows rapid heating of the radiating panel, thereby avoiding the need to keep the said panel constantly at a high temperature, thus limiting its degradation through oxidation. The thermal radiation (435) generated by the radiating-element heating device (130) allows the stratified composite blank (450) used to create the component to be raised to a temperature suited to the thermoforming thereof, while the said blank (450) is in place on the die (412) at the loading/unloading station, but also allows the moulding surface of the said die (412) to be preheated before or during the placement of the blank thereon. The said blank (450) is laid cold onto the die (412) by an operator or a robot according to embodiment variants. Advantageously, the moulding surface of the die comprises a coating, for example a black chrome plating, or a plating based on silicon carbide (SiC), that allows an improvement in its absorption of infrared radiation and of its heating by radiation. A pyrometer (not depicted) allows the temperature of the blank or of the moulding surface of the die to be measured while these are being heated by radiation. The switch (160) allows the powering current generated by the high-frequency generator (190) to be directed via the controlled connection (170) towards the network of inductors (413) of the shaping die (411) that is situated at the injection station.

Figure 5:
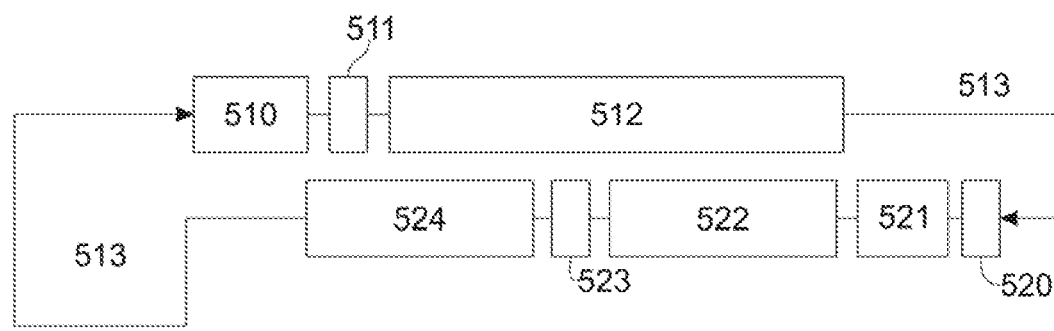
FIG. 5 is a timing diagram of one exemplary embodiment of the device that forms the subject matter of the invention according to one embodiment of the method that forms the subject matter of the invention.

In FIG. 5, according to one exemplary embodiment of the method that forms the subject of the invention, some of the manufacturing steps (510-512) are carried out on the loading/unloading station and the others of the manufacturing steps (520-524) are carried out at the injection station. Thus, the steps are performed in parallel so as to increase production rates. Starting from the loading/unloading station, in a demoulding step (510) the component previously thermoformed and overmoulded is removed from the shaping die and the die is cleaned. During a loading step (511) a composite blank is placed on the die. During a preheating step (512) the blank and the shaping die are raised by radiation to the thermoforming temperature. During this step (512) the radiating-means heating device is supplied with high-frequency current. Through a rotation (513) of the transfer table, the die and the preheated blank are carried to the injection station. At the same time, the component thermoformed and overmoulded in the other die is carried to the loading/unloading station. During a mould closure step (520) the blank is thermoformed. The network of inductors of the shaping die is connected to the high-frequency generator at the end of the transfer step. During a temperature hold step (521), the said die is kept at the thermoforming temperature in order to ensure uniform impregnation of the plies of the blank thus formed. During this time, the radiating means are no longer powered by the generator. During a cooling step (522), the thermoformed blank is cooled down to a temperature below the glass transition temperature of its polymer matrix but high enough to allow overmoulding. During an injection step (523), the overmoulding is performed. During this step, the network of inductors of the shaping die is no longer powered, and this allows the radiating heating means to be powered. During a cooling step (524), the mould formed of the shaping die and of the punch is cooled by circulation of fluid, then the mould is opened before the transfer table performs a further rotation (513), carrying the finished component, on its shaping die, to the loading/unloading station. Thus, the manufacturing operations are performed in parallel on both components even though only one single high-frequency generator is used.

The above description and the embodiments show that the invention achieves the intended goal, namely that it allows the tasks of the manufacture of two thermoformed and overmoulded components to be carried out in parallel, almost doubling the production rate, while at the same time using one single high-frequency current generator, thus limiting the installed electrical power.

The invention claimed is:
1. A device to thermoform a composite component and injection over-moulding a shape on one face of the composite component in a mould, the device comprising a paired shaping die and punch defining a moulding cavity therebetween, the shaping die being mounted on a transfer device comprising:
 a loading/unloading station to load/unload a blank onto/from the shaping die;

an injection and mould-closure station configured to close the mould and to inject between the punch and the shaping die;

wherein the shaping die comprises a moulding surface, a network of inductors to heat the moulding surface and a cooling network to cool the moulding surface by a circulation of a fluid;

wherein the loading/unloading station comprises radiating element facing the moulding surface of the shaping die, the radiating element comprising a screen and a coil, the screen being induction heated by circulating a high frequency current in the coil;

a single high-frequency generator is configured to supply a high frequency current to a first induction circuit comprising the network of inductors of the shaping die and to a second induction circuit that heats the radiating element; and a switch to alternatively power the first induction circuit and the second induction circuit.

2. The device according to claim 1, wherein the first induction circuit and the second induction circuit comprise a capacitor unit or a smoothing coil.

3. The device according to claim 1, further comprising two shaping dies, each shaping die paired with the punch and the two shaping dies being mounted on the transfer device such that one of the two shaping dies is at the loading/unloading station when the other shaping die is at the injection and mould-closure station.

4. A method for producing a shaped composite component comprising an over- moulding, comprising:
  i) implementing a device according to claim 3, wherein the switch alternatively powers the network of inductors and the induction heating circuit that heats the radiating element;
  ii) placing a composite blank on the shaping die which is cooler of the two shaping dies at the loading/unloading station;
  iii) preheating the shaping die and the composite blank in contact therewith to a temperature T1 suitable for thermoforming the composite blank;
  iv) transferring the shaping die to the injection and mould-closure station;
  v) lowering the punch onto the shaping die while maintaining the temperature T1 to perform the thermoforming of the composite blank;
  vi) cooling the shaping die to a temperature T2 suitable for consolidating the composite blank;
  vii) injecting an over-moulded part;
  viii) cooling the moulding cavity down to a demoulding temperature;
  ix) opening the mould;
  x) transferring the shaping die to the loading/unloading station;
  xi) demoulding the shaped composite component;
  xii) repeating steps ii)-xi);
    wherein steps ii) and xi) are performed on a first shaping die at the same time as steps v) to vii) are being performed on a second shaping die; and
    wherein step iii) is performed on the first die at the same time as steps viii) and ix) are being performed on the second die.

5. The method according to claim 4, wherein a single high-frequency generator supplies a high frequency current to the network of inductors and to an induction heating circuit that heats the radiating element; and wherein in step iii), the radiating element heats the composite blank and the first shaping die.

6. The method according to claim 5, wherein the switch directs the supply of high-frequency current towards the induction heating circuit that heats the radiating element during step iii) and towards the network of inductors of the second shaping die during steps v) to vii).

* * * * *